United States Patent
Lahtinen (12)

(10) Patent No.: US 6,463,291 B1
(45) Date of Patent: Oct. 8, 2002

(54) SHORT MESSAGE QUEUING MECHANISM

(75) Inventor: Lauri Lahtinen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/117,701

(22) PCT Filed: Feb. 4, 1997

(86) PCT No.: PCT/FI97/00061

§ 371 (c)(1),
(2), (4) Date: Apr. 29, 1999

(87) PCT Pub. No.: WO97/29603

PCT Pub. Date: Aug. 14, 1997

(30) Foreign Application Priority Data

Feb. 5, 1996 (FI) .................................................. 960523

(51) Int. Cl.⁷ ................................................. H04Q 7/20
(52) U.S. Cl. ...................... 455/466; 455/560; 455/458; 370/413; 370/429; 370/238
(58) Field of Search ................................ 455/466, 414, 455/417, 31.3, 31.2, 560, 445, 458; 370/400, 412–418, 429, 230–238.1

(56) References Cited

U.S. PATENT DOCUMENTS

| | | | | |
|---|---|---|---|---|
| 4,320,500 A | * | 3/1982 | Barberis et al. ............. | 370/413 |
| 4,620,066 A | * | 10/1986 | Bushnell et al. ............. | 379/113 |
| 4,771,424 A | * | 9/1988 | Suzuki et al. ............... | 370/400 |
| 4,974,224 A | * | 11/1990 | Boone ........................ | 370/400 |
| 5,146,214 A | | 9/1992 | Yamada et al. ........... | 340/825.03 |
| 5,299,259 A | | 3/1994 | Otto ............................ | 379/221 |
| 5,392,452 A | | 2/1995 | Davis ......................... | 455/38.1 |
| 5,406,616 A | | 4/1995 | Bjorndahl .................... | 455/433 |
| 5,418,835 A | | 5/1995 | Frohman et al. ............. | 455/413 |
| 5,548,533 A | * | 8/1996 | Gao ............................ | 709/235 |
| 5,579,372 A | * | 11/1996 | Astom ......................... | 455/412 |
| 5,787,357 A | * | 7/1998 | Salin .......................... | 455/466 |
| 6,049,547 A | * | 4/2000 | Fisher et al. ................ | 370/412 |

FOREIGN PATENT DOCUMENTS

| | | |
|---|---|---|
| FI | 96732 | 4/1996 |
| WO | 94/05124 | 3/1994 |

OTHER PUBLICATIONS

Technical Realization of the Short Message Service–Point–To–Point, European digital cellular telecommunication system (Phase 1), Feb. 1992, 1–100.

* cited by examiner

Primary Examiner—Edward F. Urban
Assistant Examiner—Charles Craver
(74) Attorney, Agent, or Firm—Pillsbury Winthrop LLP

(57) ABSTRACT

The invention relates to a method of processing such a short message arriving at a mobile switching center of a cellular radio network which arrives at the same time as a preceding short message is being sent from the mobile switching center of a B-subscriber. In addition, the invention relates to a mobile switching center of a cellular radio system implementing the method. When a short message addressed to a B-subscriber arrives at a mobile switching center at the same time as previously arrived short messages are being sent to the B-subscriber, then the exchange stores the newest short message in a queue. A problem arises when the total delay of the queue is longer than the maximum time, defined by time supervision, used on a connection between the exchange and a service center. To avoid exceeding the time supervision, the total delay of an incoming short message is estimated, the total delay comprising a queuing time resulting from the preceding short messages and the actual transmission time of said short message. If the total delay is longer than the maximum time, the incoming short message is not stored in a queue, but a negative acknowledgement is sent to the service center, on account of which it will send the short message again after a certain time.

6 Claims, 3 Drawing Sheets

1

SHORT MESSAGE QUEUING MECHANISM

This application is the national phase of international application PCT/FI97/00061 filed Feb. 4, 1997 which designated the U.S.

BACKGROUND OF THE INVENTION

1. Field of the Invention

The invention relates to a method of processing a short message that arrives at a mobile switching centre of a cellular radio network at the same time as a preceding short message is being sent from the mobile switching centre to a B-subscriber. The invention also relates to a mobile switching centre of a cellular radio system implementing the method.

2. Description of Related Art

FIG. 1 illustrates the parts of a cellular mobile system that are essential to the invention. Mobile Stations MS1–MS3 communicate with respective Base Transceiver Stations BTS1–BTS3 that serve Cells Cn. The base transceiver stations are connected via Base Station Controllers BSC to Mobile Switching Centres MSC.

Description of Related Art

A mobile switching centre MSC connects incoming and outgoing calls. It performs similar functions as an exchange of a Public Switched Telephone Network PSTN. In addition to these, it also performs functions that are typical of mobile traffic only, such as subscriber location management, in co-operation with the subscriber registers of the network. In the GSM system, the subscriber registers include at least a Home Location Register HLR and a Visitor Location Register VLR.

The mobile switching centres MSC communicate via a Gateway Mobile Switching Centre GMSC with other networks, such as a Public Switched Telephone Network PSTN and/or an Integrated Services Digital Network ISDN.

In connection with cellular radio networks, it is possible to use Short Message Services SMS, by which short messages are sent via a separate short message service centre, or in short, Service Centre SC.

One such system transmitting and forwarding short messages is described in GSM recommendation 03.40, February 1992, 'Technical Realization of Short Message Services Point to Point', ETSI/PT. It describes how a service centre is connected to a mobile switching centre of a cellular radio network and how the service centre operates as it transmits and forwards short messages from outside the cellular radio network and from a subscriber (A-subscriber) of a cellular radio network to a second subscriber (B-subscriber) of the network or to a means of communication that is outside the network but is capable of receiving and/or transmitting short messages. GSM recommendation 04.11, February 1992, 'MS-BSS Interface—Support of Short Message Service (p-p)', ETSI/PT 12 gives a more detailed description of forwarding of short messages on the radio path between GSM terminal equipments, a mobile switching centre MSC and a service centre SC.

When a service centre SC attempts to send a short message to a B-subscriber and the B-subscriber cannot be reached, a Message Waiting Data list according to the GSM recommendation 03.40 is formed in the home location register HLR. In the list are stored, specifically for each B-subscriber, addresses of the service centres SC that have in their memories short messages to be forwarded to the B-subscriber. When the B-subscriber registers in the network, i.e. a short message can be sent to the mobile phone of the subscriber, the visitor location register VLR in the area of which the B-subscriber registers sends the home location register of the B-subscriber information indicating that the B-subscriber is reachable in the network. The home location register HLR of the B-subscriber then starts to send notifications, i.e. Alert messages, to the services centres SC mentioned in the Message Waiting Data List of the subscriber concerned, the Alert messages informing the service centres that the B-subscriber has become active in the area of the cellular radio network and that a short message can be sent to the mobile phone of the B-subscriber. This kind of situation occurs, for example, when a subscriber switches off his mobile phone for the night and switches it on again in the morning, or when a subscriber uses a mobile phone at work, switching it on as the working hours begin. Alert messages trigger transmission of the short messages of the B-subscriber from the service centres SC via the cellular radio system to the B-subscriber. The short messages are stored in the service centre on the basis of a Mobile Station international PSTN/ISDN Number MSISDN of the B-subscriber. The service centre SC, however, does not recognize the MSISDN numbers as belonging to one and the same subscriber, but it can simultaneously start transmission of several short messages to the same B-subscriber. Likewise, if several service centres SC attempt to send short messages to one and the same B-subscriber essentially simultaneously, a mobile switching centre MSC located in connection with a visitor location register VLR cannot transmit short messages that have arrived during the transmission of a preceding short message, but it has to send a negative acknowledgement to the service centre SC. Collision of short messages at a mobile switching centre MSC thus causes transmission of negative signalling messages to the service centre SC. The service centre SC then waits for a predefined time before it attempts to send the short message again. It may occur that several short messages have been sent to a B-subscriber while the B-subscriber has not been registered in the cellular radio network, and so the short messages destined to the B-subscriber have been stored in the memories of various service centres for later transmission to the B-subscriber. When the B-subscriber becomes active in the area of the cellular radio network, the home location register HLR of the B-subscriber sends Alert messages to all service centres SC in the memories of which there are short messages addressed to the B-subscriber. All the service centres SC then attempt to send their short messages to the B-subscriber almost simultaneously. Short messages collide in the mobile switching centre MSC of the location area of the B-subscriber, since the mobile switching centre MSC can send only one short message at a time.

The problem is even worse if several mobile, stations MS to which short messages have been sent during their absence from the network register in the network essentially simultaneously. As the mobile stations MS register in the cellular radio network, several service centres SC attempt to send short messages to B-subscribers and only some of the transmissions are successful. Acknowledgements indicating unsuccessful transmissions and retransmissions of short messages cause plenty of additional signalling in the cellular radio network.

A partial solution to the above problem is disclosed in the Applicant's own Finnish Patent Application 923,597. Referring now to FIG. 2, in the solution of FI '597, the Queue Control Management QCM of the mobile switching centre MSC stores a later arrived and thus congested short message in a queue, or Message Memory MM, until a new short message transmission attempt becomes possible. Each short message stored in the queue MM is corresponded to by an identifier, on the basis of which the short message is later retrieved from the queue MM. This is done when a B-subscriber Operation Controller OC detects that the transmission of a preceding short message has ended and notifies the queue control management QCM, which reads a congested short message from the memory MM and sends it to a Short Message Output Means SMOM for further transmission via the base station controller BSC and the base transceiver station BTS to the mobile station MS of the B-subscriber.

FI '597 thus teaches a solution to the problem of ensuring that the short message is delivered to the B-subscriber. In FIG. 3, SC stands for a service centre, MSC for an exchange within the area of which a B-subscriber is located, and messages SM stand for short messages that have arrived to the B-subscriber at different times. The art disclosed in FI '597 can be applied such that an acknowledgement (SM_Delivery_Ack) to short message delivery (SM_Delivery) is sent directly from the exchange MSC to the service centre SC. A problem arises when the connection between the exchange MSC and the B-subscriber MS is broken, for example because of a network error or simply because the mobile station MS of the B-subscriber is switched off. In this case, the service centre would have received an acknowledgement (SM_Delivery_Ack) even if no short message had been delivered to the B-subscriber MS.

If, on the other hand, the art described in FI '597 is applied in accordance with FIG. 3, i.e. an acknowledgement (SM_Delivery_Ack) is not sent until a B-subscriber has received a short message SM n, then the following problem arises. The signalling protocols, such as the MAP protocol, between the service centre SC and the mobile switching centres MSC, include different timers for supervising that an acknowledgement is received to a message during a certain time supervision period. The duration of such time supervision can be, for example, 1 minute. Upon receiving a short message (SM_Delivery) from a service centre SC, an exchange MSC can have in its memory several short messages SM n-1, SM n-2, etc. addressed to one and the same B-subscriber MS. In FIG. 3, the width of the arrows corresponding to the short messages SM n-1, SM n-2, etc. illustrates the fact that the short messages may be of different length and that the time needed for their transmission, i.e. transmission time, may vary in length.

In FIG. 3, broken arrows illustrate the fact that a short message (SM_Delivery) arriving at the exchange cannot be forwarded to the B-subscriber MS until after the transmission of the short messages SM n-1, SM n-2, etc. that have been stored in the queue earlier. An acknowledgement (SM_Delivery_Ack) is not sent until the previously received short messages SM n-1, SM n-2, etc. as well as the current short message SM n have been sent. If the queuing time resulting from the short messages SM n-1, SM n-2, etc. stored in the queue earlier plus the transmission time of the latest short message SM n exceeds the maximum time defined by the above time supervision, then the service centre SC will not receive an acknowledgement during the time supervision, which raises various problems.

SUMMARY OF THE INVENTION

The object of the present invention is to improve the short message services of a mobile network, solving the above problems.

The invention is based on supplementation of queue control management QCM. The queue control management QCM according to the invention can function, for example, in such a way that when a short message is being stored in the memory of a mobile switching centre in the location area of a B-subscriber, an estimated total delay is defined beforehand for the short message. The total delay can be estimated on the basis of the transmission capacity of the base station subsystem BSS on the one hand and the maximum time determined by the timer associated with the short message services on the other hand. If the total delay is estimated to be shorter than the maximum time determined by the time supervision, then the short message is put in a queue. Otherwise, the short message is not put in a queue, but a negative acknowledgement, indicating a temporary error, is returned to the service centre SC. On account of the negative acknowledgement, the service centre SC will make a new attempt to send the message after a while.

The advantage of the method and equipment of the invention is that the length of the queue of short messages can be limited to a value at which successful transmission of a short message can be guaranteed. The invention reduces the amount of resources allocated for queuing and the risk of interference resulting from overloading the cellular radio system.

BRIEF DESCRIPTION OF THE DRAWINGS

In the following the invention will be described in greater detail with reference to the attached drawings, in which.

DESCRIPTION OF THE PREFERRED EMBODIMENTS

Figure 1:
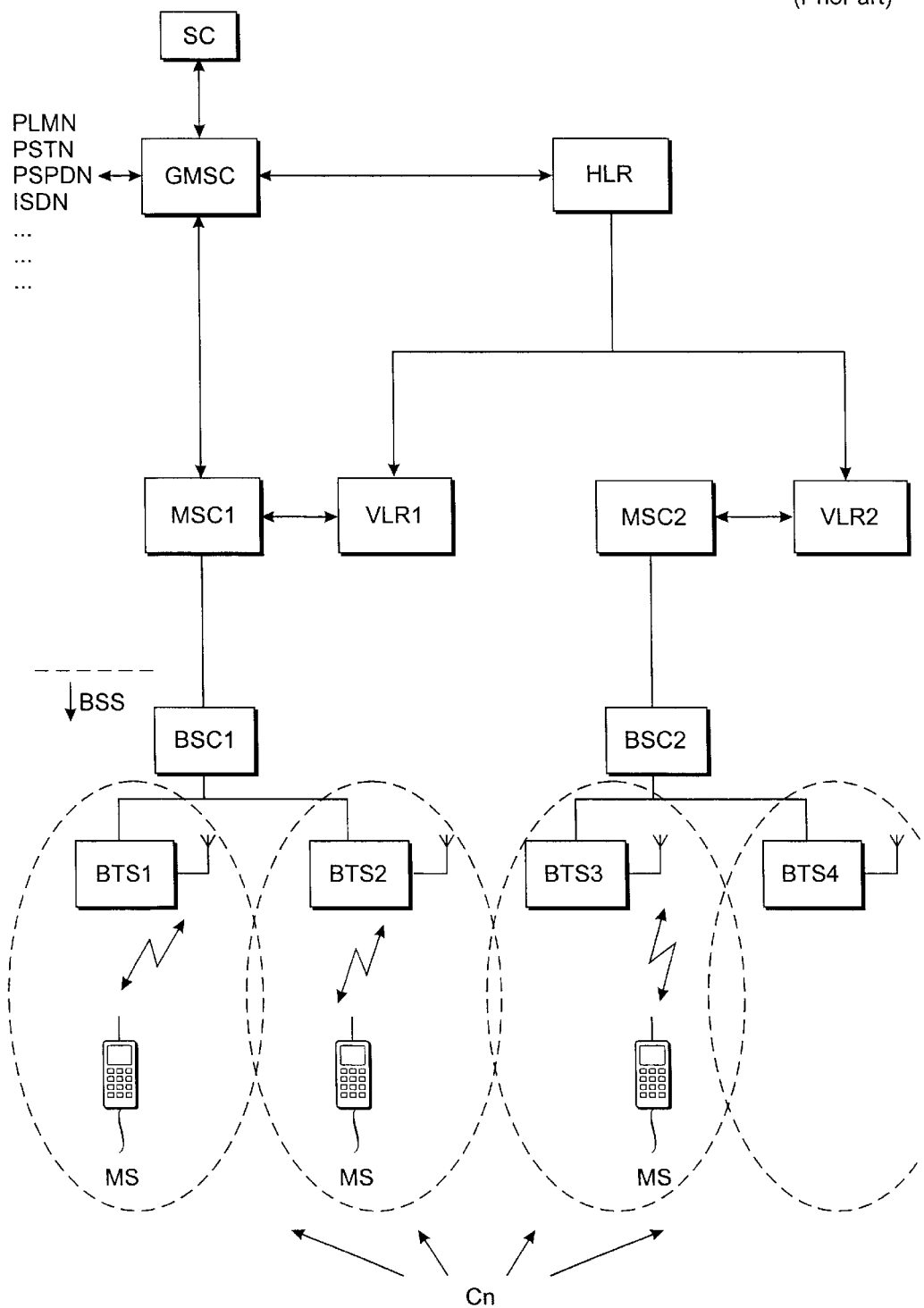
FIG. 1 shows a schematic view of a cellular radio system in which the method and mobile switching centre of the invention can be used.
Figure 2:
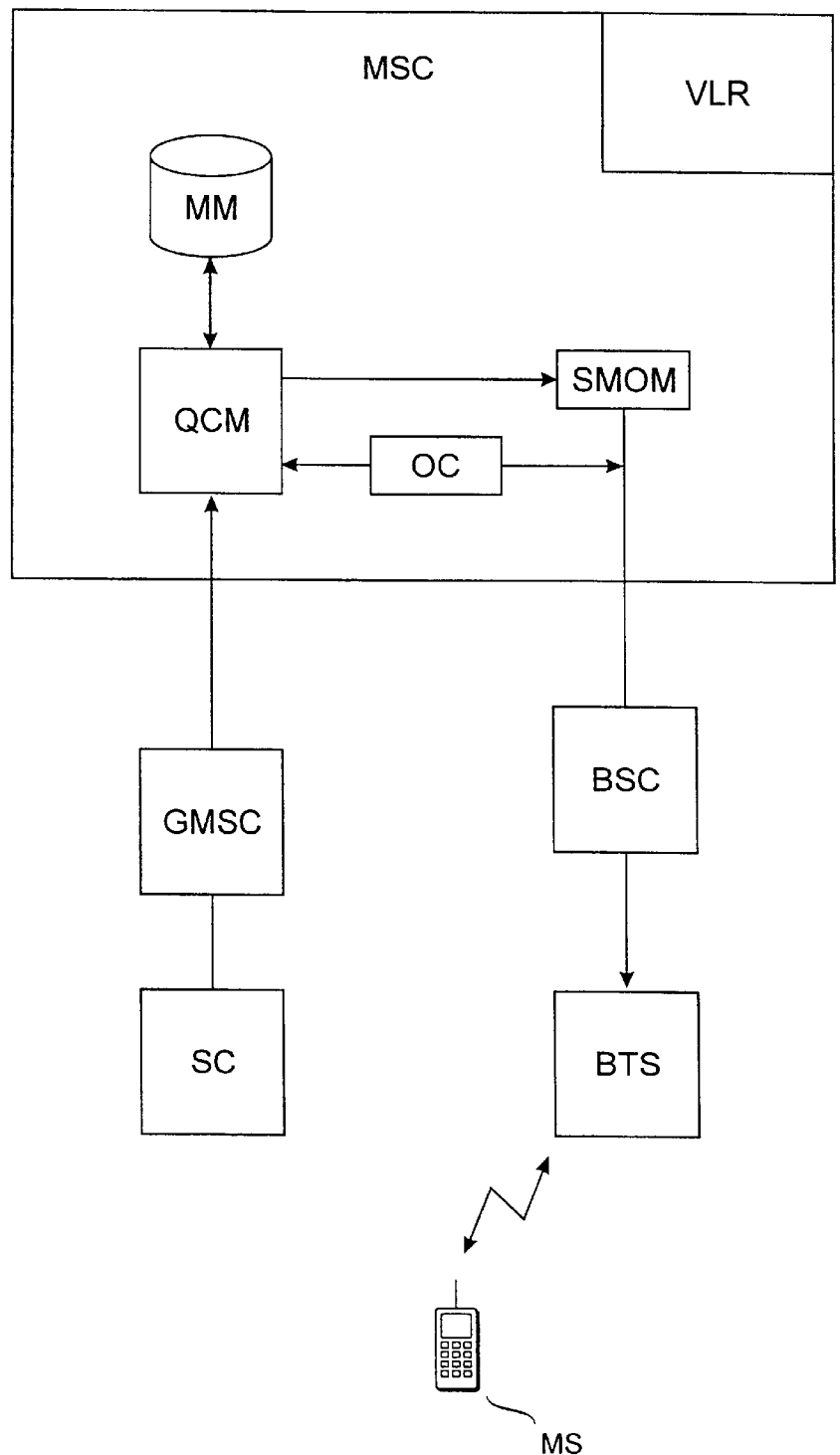
FIG. 2 is a block diagram illustrating a mobile switching centre of the invention.
Figure 3:
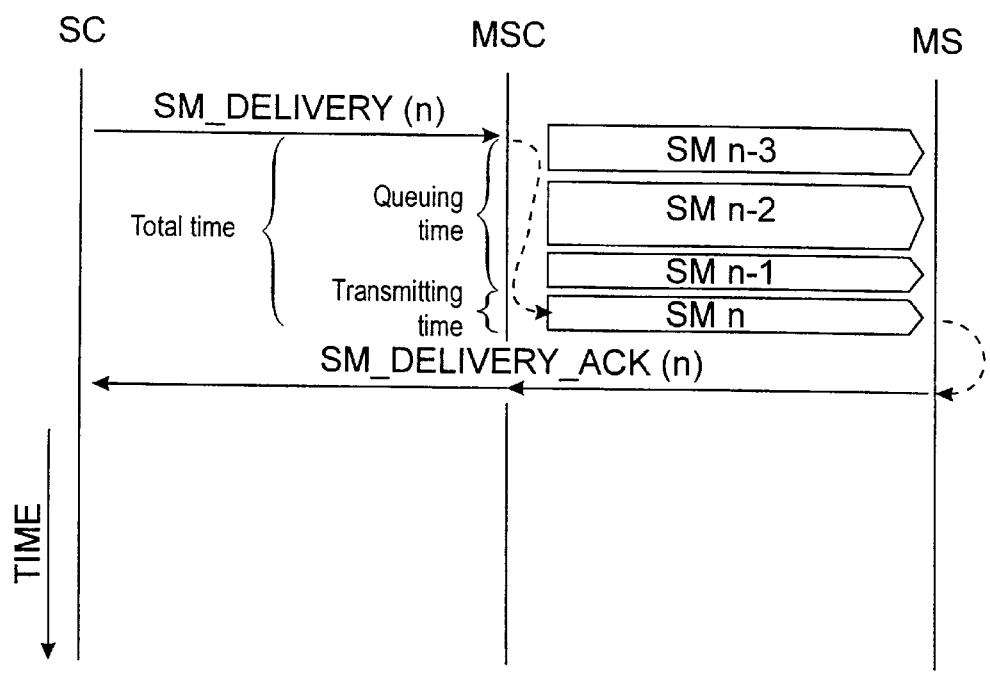
FIG. 3 shows messages between a service centre, a mobile switching centre and a B-subscriber.

In FIGS. 2 and 3, the service centre SC sends a short message via a gateway mobile switching centre GMSC to the mobile switching centre MSC of the B-subscriber, to which the visitor location register of the location area of the B-subscriber MS has been connected. The invention is useful in a situation where a preceding short message is being sent from the exchange MSC to the mobile station MS of the B-subscriber. The queue control management QCM of the exchange MSC here determines an estimated total delay to an incoming short message. The total delay comprises both the queuing time, i.e. the time needed for sending the short messages SM n-1, n-2, . . . stored in the queue MM, and the duration of the transmission of the short message SM n concerned. The total delay can be defined, for example, such that a message-specific partial delay is calculated for each short message SM n-1, n-2, . . . in the queue MM as well as for the short message SM n currently arriving at the exchange MSC, and that the partial delays are subsequently added. A message-specific partial delay comprises two partial times. The first partial time is a short-message-specific fixed partial time, which can be defined empirically. 'Fixed' here means a partial time that is not dependent on the length of the message. The second partial time is the time needed for the actual transmission of the short message. The second partial time is dependent on the length of the short message. The length of the partial time is the length of the short message divided by the short message transmission rate, the result being rounded up to full units of time, which in the GSM system means TDMA frames. In a frame of the GSM system, it is possible to send about 20 bytes of data, such as short messages. If desired, the accuracy can be improved by taking into account only that part of the short message under transmission which has not been sent yet.

The resultant estimated total delay is compared with the maximum time defined by the timer. If the estimated total delay is shorter than the maximum time defined by the timer, then the short message is put in a queue MM. If the estimated total delay is longer than the maximum time defined by the timer, then the short message is not put in a queue, but a negative acknowledgement (e.g. SM_Delivery_Nack), indicating a temporary error, Is returned to the service centre SC. On account of the negative acknowledgement, the service centre SC will make a new attempt to send the short message after a while. When the B-subscriber has received the short message SM n, it sends an acknowledgement (e.g. SM_Delivery_Nack) indicating that the short message has arrived at the mobile station MS of the B-subscriber. The exchange MSC detects the acknowledgement and forwards it to the service centre SC.

The above parameters, such as the fixed message-specific partial time and the short message transmission rate (bytes per second), can be, for example, manually adjustable parameters. Alternatively, the exchange can monitor the variables independently and maintain the corresponding parameters located in the memory.

The short messages and acknowledgements indicating their reception contain a short message identity, on the basis of which notifications relating to different short messages can be directed to the correct short message. In FIG. 3, the short message identity is corresponded to by indexes n, n−1, etc. For the sake of clarity, FIG. 3 shows only the acknowledgement indicating successful reception of the short message SM n.

The drawings and the description thereof are intended only to illustrate the idea of the invention. The method of the invention for processing a short message arriving at a mobile switching centre of a cellular radio network and a mobile switching centre of a cellular radio system may vary in their details within the scope of the claims. Although the invention is described above mainly in connection with the GSM system, it can also be used in other kinds of radio systems.

What is claimed is:

1. A method performed at a receiving mobile switching center and to process a short message received by the receiving mobile switching center from a sending unit during transmission of at least one previously received short message, wherein the mobile switching centre is configured to optionally store received short messages in a queue, the method comprising:

estimating a total delay, the total delay being defined as a time period between a moment when an arriving short message arrives at the mobile switching centre and a moment when the mobile switching centre will send the arriving short message to the B-subscriber;

comparing the estimated total delay with a predefined threshold value;

if the estimated total delay is less than the predefined threshold value, storing the arriving short message in the queue and sending the arriving short message when at least one previously received short message previously stored in the queue has been sent; and if the estimated total delay is greater than the predefined threshold value, not storing the arriving short message in the queue and sending a negative acknowledgement to the sending unit;

wherein estimating includes adding short-message-specific partial delays associated with the at least one previously received short message located in the queue and that of the arriving short message arriving at the mobile switching centre;

wherein the short-message-specific partial delays are defined by adding a fixed first partial time and a second partial time, which is based on a length of the arriving short message.

2. The method of claim 1, wherein the second partial time is defined by dividing the length of the arriving short message by a parameter corresponding to at least transmission capacity of an associated transmission system and by rounding a result up to a time that corresponds to full frame times.

3. The method according to any one of claims 1 or 2, wherein the predefined threshold value is shorter than a maximum time of a time supervision used in a network connection.

4. The method of claim 3, wherein the network connection includes a mobile application part connection between a mobile switching centre and a short message transmitting unit.

5. The method of claim 4, wherein the short message transmitting unit is a service centre.

6. A mobile switching centre comprising:

a short message output means for sending one short message at a time to a B-subscriber;

a B-subscriber operation controller configured to prevent transmission of a newly received short message when transmission of a previously received short message to the B-subscriber is in progress;

a queue configured to store short messages; and a queue control means configured to read a congested short message from the queue and send it to the B-subscriber when the transmission of the previously received short message has been completed;

wherein the queue control means further comprises:

a means for defining a total delay as a time period from the moment when the newly received short message (SM n) arrives at the mobile switching center to a moment when the mobile switching center will transmit the newly received short message;

means for comparing an estimated total delay with a predefined threshold value;

means for storing the newly received short message in the queue and, in response to the estimated total delay being less than the predefined threshold value, sending a positive acknowledgement to a sending unit that has sent the newly received short message; and means for sending a negative acknowledgement to the sending unit in response to the estimated total delay exceeding the predefined threshold value;

wherein the predefined threshold value is shorter than a maximum time of a time supervision used in a network connection.

* * * * *